(12) United States Patent
Sheesley

(10) Patent No.: US 9,688,469 B2
(45) Date of Patent: Jun. 27, 2017

(54) MODIFIED CARGO CONTAINER FOR DELIVERY OF PROPPANT TO A FRAC SITE

(71) Applicant: SANDCAN, LLC, San Antonio, TX (US)

(72) Inventor: John M. Sheesley, San Antonio, TX (US)

(*) Notice: Subject to any disclaimer, the term of this patent is extended or adjusted under 35 U.S.C. 154(b) by 0 days.

(21) Appl. No.: 14/958,223

(22) Filed: Dec. 3, 2015

(65) Prior Publication Data
US 2016/0083181 A1 Mar. 24, 2016

Related U.S. Application Data

(62) Division of application No. 13/370,401, filed on Feb. 10, 2012, now abandoned.

(51) Int. Cl.
| | |
|---|---|
| B65D 43/14 | (2006.01) |
| B65D 90/58 | (2006.01) |
| B65D 90/66 | (2006.01) |
| B65D 88/30 | (2006.01) |
| B65D 88/32 | (2006.01) |
| B65G 65/00 | (2006.01) |
| B65G 65/30 | (2006.01) |

(52) U.S. Cl.
CPC ........... *B65D 90/587* (2013.01); *B65D 88/30* (2013.01); *B65D 88/32* (2013.01); *B65D 90/66* (2013.01); *B65G 65/00* (2013.01); *B65G 65/30* (2013.01); *B65D 2590/664* (2013.01)

(58) Field of Classification Search
CPC ........ B65D 88/30; B65D 88/32; B65D 88/26; B65D 88/121; B65D 88/12; B65D 88/127; B65D 90/664; B65D 90/587; B65D 90/66; B65D 43/20
USPC ........................... 220/812; 49/208–210, 360
See application file for complete search history.

(56) References Cited

U.S. PATENT DOCUMENTS

| | | | |
|---|---|---|---|
| 2,460,181 A | 1/1949 | Marshall | |
| 4,819,830 A | 4/1989 | Schultz | |
| 4,944,421 A | 7/1990 | Yurgevich | |
| 4,995,522 A | 2/1991 | Barr | |
| 5,190,182 A | 3/1993 | Copas et al. | |
| 6,012,598 A | 1/2000 | Antoniou | |
| 6,105,805 A | 8/2000 | Labelle et al. | |
| 6,196,590 B1 * | 3/2001 | Kim | B60P 3/224 220/262 |
| 6,401,983 B1 | 6/2002 | McDonald et al. | |
| 7,104,425 B2 | 9/2006 | Le Roy | |
| 7,591,386 B2 * | 9/2009 | Hooper | B65D 88/121 220/1.5 |
| D688,349 S | 8/2013 | Oren et al. | |
| D688,350 S | 8/2013 | Oren et al. | |
| D688,351 S | 8/2013 | Oren et al. | |

(Continued)

*Primary Examiner* — Michael McCullough
*Assistant Examiner* — Mark Hageman
(74) *Attorney, Agent, or Firm* — Gunn, Lee & Cave, P.C.

(57) ABSTRACT

A cargo container is modified to carry a fracing proppant such as sand from a quarry or source to the frac site. Openings are cut in the top and bottom of a cargo container and hydraulically operated sliding doors are placed there under. A hopper module with the walls being inclined to approximately the angle of repose for the proppant is installed inside the cargo container. The hopper module is sealed inside the cargo container so that a proppant enters through the top opening at the quarry and flows out through the bottom opening at the fracing site.

12 Claims, 21 Drawing Sheets

(56) References Cited

U.S. PATENT DOCUMENTS

| | | |
|---|---|---|
| D688,597 S | 8/2013 | Oren |
| D688,772 S | 8/2013 | Oren et al. |
| 8,505,780 B2 | 8/2013 | Oren |
| 8,545,148 B2 | 10/2013 | Wanet-Pusset et al. |
| D694,670 S | 12/2013 | Oren |
| 8,622,251 B2 | 1/2014 | Oren |
| 8,668,430 B2 | 3/2014 | Oren |
| D703,582 S | 4/2014 | Oren |
| 8,887,914 B2 * | 11/2014 | Allegretti ............... B65D 19/06 108/51.11 |
| 8,915,691 B2 * | 12/2014 | Mintz .................... B65D 88/54 198/533 |
| 2008/0226434 A1 | 9/2008 | Smith |
| 2009/0078410 A1 | 3/2009 | Krenek et al. |
| 2011/0127178 A1 | 6/2011 | Claussen |
| 2013/0118750 A1 | 5/2013 | Gu et al. |
| 2013/0161211 A1 | 6/2013 | Oren |
| 2014/0020765 A1 | 1/2014 | Oren |
| 2014/0023463 A1 | 1/2014 | Oren |
| 2014/0023464 A1 | 1/2014 | Oren |
| 2014/0023465 A1 | 1/2014 | Oren |

* cited by examiner

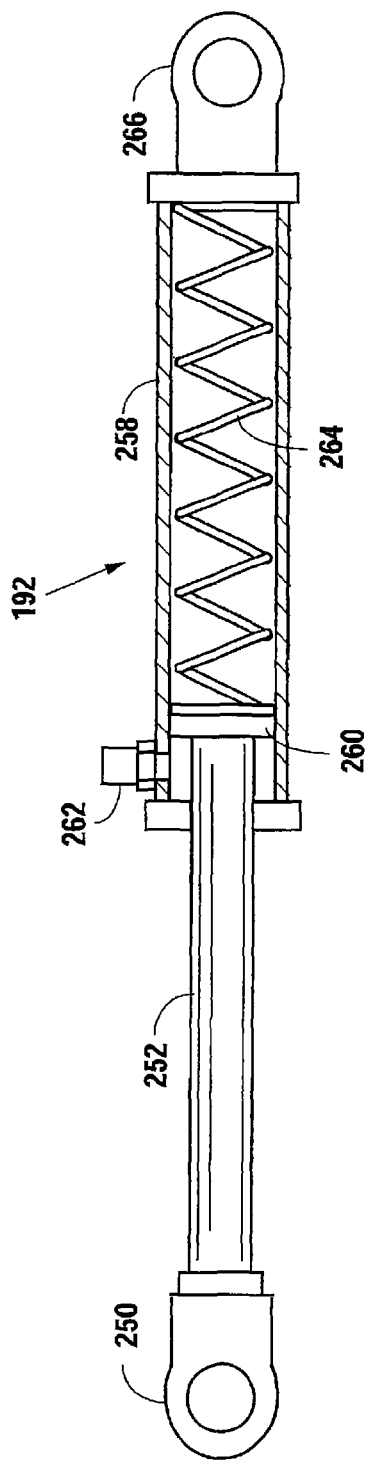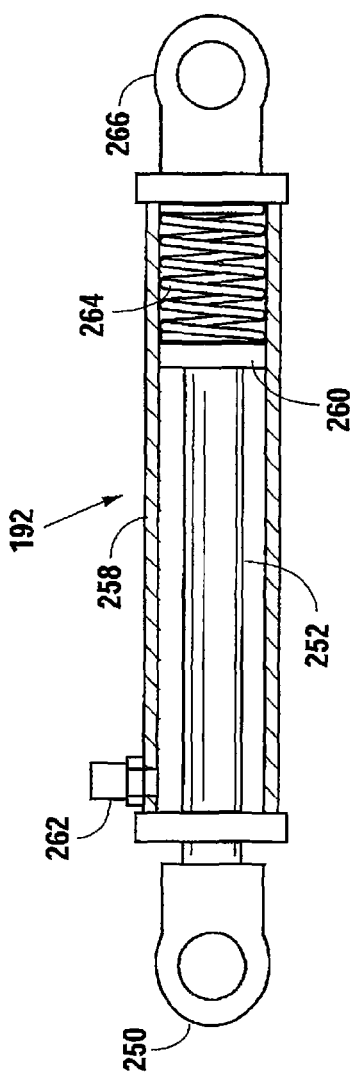
Fig. 21A
Fig. 21B

MODIFIED CARGO CONTAINER FOR DELIVERY OF PROPPANT TO A FRAC SITE

CROSS-REFERENCES TO RELATED APPLICATIONS

This is a divisional patent application claiming priority to and the benefit of U.S. non-provisional patent application Ser. No. 13/370,401, filed Feb. 10, 2012, and entitled "Method and Apparatus for Modifying a Cargo Container to Deliver Sand to a Frac Site," which is hereby incorporated by reference herein.

BACKGROUND OF THE INVENTION

1. Field of the Invention

This invention relates to the transportation of a granular substance such as sand and, more particularly, to the modification of cargo containers for the purpose of transporting sand therein to frac sites.

2. Description of the Prior Art

Cargo containers (also called intermodal containers, freight containers, ISO containers, shipping containers, Hi-Cube containers, Sea Cans) are standardized, reusable steel boxes used for the safe, efficient and secure storage and movement of materials and products within a global containerized freight transportation system. The container can be moved from one mode of transportation to another without unloading and reloading the contents of the container. All of the containers are 8 ft. wide so they can travel along standard highway systems. The height of the standard container is normally 8 ft. 6 in., but a "high cube" container of 9 ft. 6 in. in height can be used.

The part of the standard cargo container that may change is the length. The standard length size is either 20 ft. or 40 ft.

A general purpose cargo container has doors fitted at one end and is constructed of corrugated weathering steel. The cargo containers can be stacked up to seven containers high. At each of the eight corners are castings with openings for twist-lock fasteners to hold the cargo containers in position. It is estimated there are 17 million cargo containers available world-wide.

In the last two years, hydraulic fracturing (also known as "fracing") has been used in hydrocarbon wells to create cracks in underground reservoir rock formations to create new channels in the rock, which increases the extraction rate and ultimate recovery of fossil fuels. To keep the fractures from closing, during the fracing process, a proppant is injected with a fluid, which proppant keeps the fractures open once the pressure is released. The most common proppant used is sand, although in recent years other proppants such as resin-coated or ceramic sand have been utilized.

In reservoirs such as shale rock or coal beds, fracing may be used to cause the production of natural gas or oil from those formations. Otherwise, there is not sufficient viscosity, permeability or reservoir pressure to allow the natural gas or oil to flow from the rock into the well bore at economic rates. Fracturing will provide flow paths connecting a larger area of the reservoir to the well, thereby increasing the area from which natural gas or liquids can be recovered from a formation. In such case, a proppant, such as sand, is necessary to keep the fractures open with the oil and gas flowing there through.

In the fracturing of a single well, the amount of proppant such as sand that is used can cost five or six million dollars. Most of the cost of the sand is for handling. If the sand can be handled fewer times, the cost can be greatly reduced.

The type of sand used in fracing is also very critical. The sand should have high quartz content so that it will not crush in the cracks of the formation, but will hold the cracks open. The deeper the well, normally the more quartz content that is required. In order to get the appropriate types of sand, fracing companies are having to purchase it throughout the world. For example, in deep wells in South Texas, the good quality fracing sand comes from such places as the State of Wisconsin, China, or Russia. From other countries, the sand is delivered to the United States by ship and is handled at multiple locations in multiple ways with very inefficient supply chain logistics for the handling of the fracing sand. The more times the fracing sand is handled, the more expensive it is to the individual fracing company and to the well operator. This is passed along to the consumer in the increased price of gasoline.

Also at the well site if a truck delivers sand and cannot unload when the truck arrives, then the operator is charged the demurrage for waiting. It is common at many frac sites for a number of trucks to be waiting in line to be unloaded, for which the operator is being charged demurrage. It is important that as soon as the sand is delivered to the frac site, that it can be immediately unloaded to eliminate the demurrage.

SUMMARY OF THE INVENTION

It is an object of the present invention to modify standard cargo containers for the delivery of granular material for fracing.

It is another object of the present invention to provide an insert for cargo containers so the cargo containers are modified to carry sand therein.

It is still another object of the invention to modify a cargo container so that sand can be inserted from the top and removed from the bottom of a totally self-contained unit.

It is another object of the present invention to provide cargo containers that can carry sand all the way from the quarry to the ultimate destination of a fracing site without repeated handling of the sand.

A standard cargo container is 8 ft.×8 ft. 6 in.×20 ft. and can be modified to carry fracing sand. A hole is cut in the top and the bottom. A hopper module is inserted into the cargo container through doors at one end of the cargo container. An upper hatch is located in a hole in the top and used to load sand in the cargo container. A lower hatch is in the opening in the bottom and may be opened to remove the sand therefrom. Hydraulic controls are used to open and close the upper or lower hatches.

The modified cargo containers may be taken directly to the quarry and loaded with sand. The modified cargo containers can then move through of the normal modes of transportation including ship, barge, rail or by truck, all the way to the frac site. The sand never has to be handled again. All that has to occur is the modified cargo container is moved from one mode of transportation to another (i.e., ship-to-rail-to-truck) as it moves from the quarry to the frac site.

Also, the modified frac containers may be stacked in any conventional means, either while in transit or at the frac site. This eliminates the demurrage of waiting to unload sand into bulk sand containers at the frac site.

DESCRIPTION OF THE DRAWINGS

FIGS. 21A and 21B illustrate a spring-loaded cylinder being used to open or close a hatch.

DESCRIPTION OF THE PREFERRED EMBODIMENT

Figure 1:
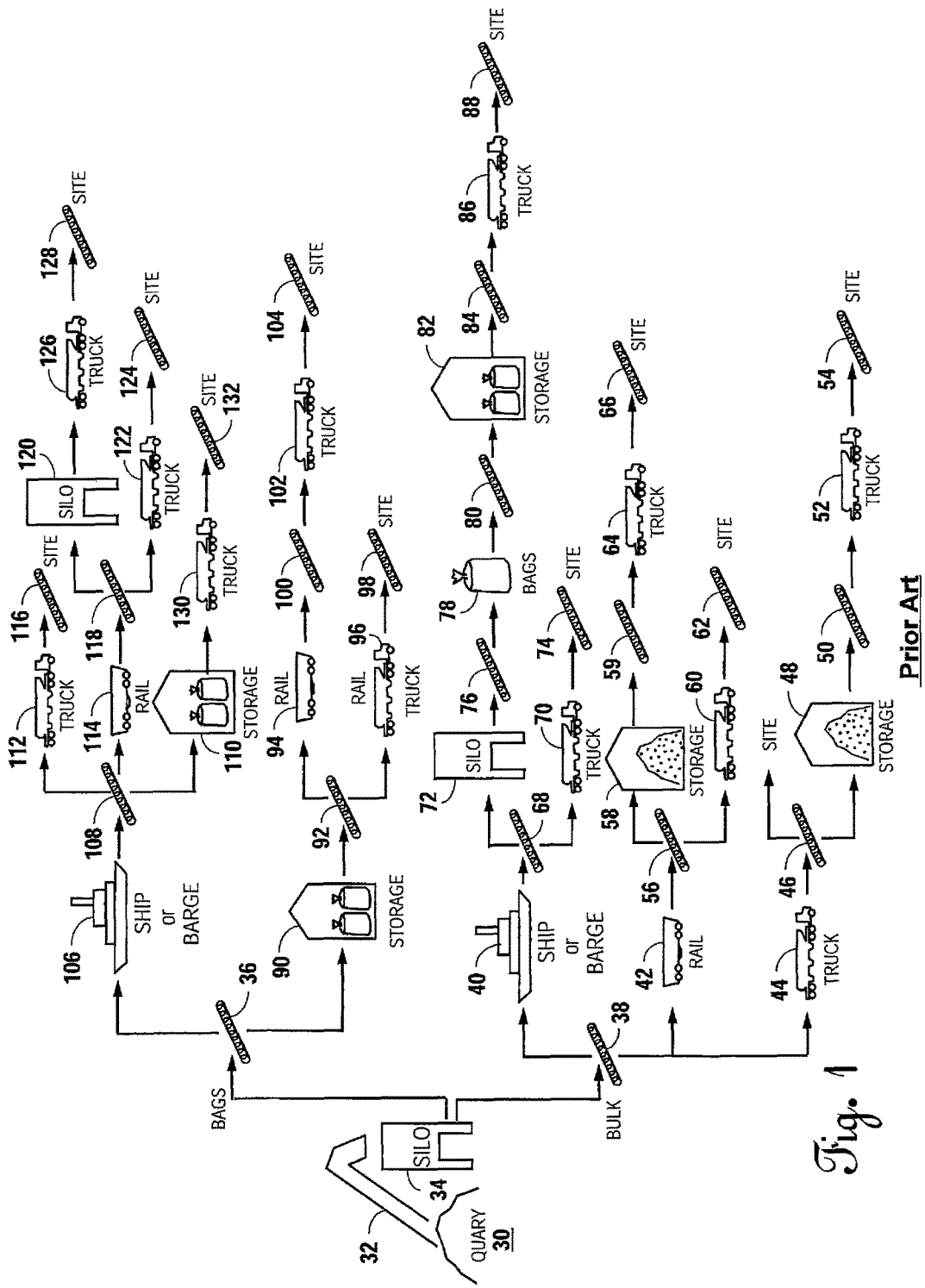
FIG. 1 is a pictorial illustration of all the ways sand is delivered from the quarry to the frac site.

Referring first to FIG. 1, fracing sand may be produced in a quarry 30, which sand is loaded to an elevator 32 into a sand silo 34. From the sand silo 34, sand may be loaded by conveyer 36 into bags or is left in bulk by conveyer 38 into a ship or barge 40, rail car 42, or truck 44.

Referring first to the truck 44, the truck 44 may be unloaded by conveyer 46 at the site or at the storage 48. While shown as conveyer 46, any other type of unloading/ loading device can be used, such as a pneumatic pump. From storage 48, the sand may be reloaded by conveyer 50 onto truck 52 for unloading by conveyer 54 at the site.

If the fracing sand comes by rail car 42, rail car 42 may be unloaded by conveyer 56 into storage 58 or truck 60. If loaded into truck 60, then the sand would be unloaded by conveyer 62 at the frac site. If the sand goes through storage 58, it will later have to be loaded by conveyer 59 onto trucks 64 and then unloaded at the frac site by conveyer 66.

If the fracing sand comes by ship or barge 40, the ship or barge 40 will be unloaded by conveyer 68 into truck 70 or sand silo 72. If loaded into truck 70, the sand can be taken to the frac site and unloaded by conveyer 74. For sand traveling by ship or barge 40 that is placed in sand silo 72, sand from the sand silo 72 may be loaded through conveyer 76 into bags 78, which bags are moved by conveyer 80 into storage 82. From storage 82 bags 78 will subsequently be opened and loaded through conveyer 84 onto sand truck 86 for delivery to the site and unloaded by conveyer 88.

Bags from conveyer 36 may be located in storage 90. From the storage 90, the bags may be emptied onto conveyor 92 and loaded onto either rail car 94 or truck 96. If loaded onto truck 96, then the sand will be unloaded on conveyor 98 at the frac site. If the sand is loaded onto rail car 94, it must later be transferred via conveyer 100 onto truck 102 prior to unloading by conveyer 104 at the frac site.

Also, the bags of sand from conveyer 36 can be loaded on ship or barge 106. From the side of the ship or barge 106, the sand may either be unloaded from the bags or left in the bags. If left in the bags, then bags of sand would be unloaded by conveyer 108 into storage 110. If unloaded from the bags, the sand then would be loaded by the conveyer 108 into either truck 112 or rail car 114. If loaded on truck 112, the sand will be taken and unloaded at the frac site by conveyer 116. If unloaded into rail car 114, sand will be unloaded by conveyer 118 into either sand silo 120 or truck 122. If unloaded into truck 122, then it could be taken to the frac site and unloaded by conveyer 124. If unloaded into the sand silo 120, sand must subsequently be loaded into truck 126 and can be moved to the frac site and unloaded by conveyer 128.

If the sand was put into sand storage 110, the bags then must be opened and emptied into truck 130, taken to the frac site and unloaded by conveyer 132.

As can be seen from FIG. 1, there are numerous different ways of moving the sand from the quarry 30 or manufacturing site to the various frac sites. Each time the sand has to be handled through a conveyer, it is an additional expense. Each additional expense means that sand costs more money for the well operator, which goes into additional costs of producing oil, which flows on to the end consumer through higher prices of gasoline, diesel fuel, or natural gas.

Figure 9:
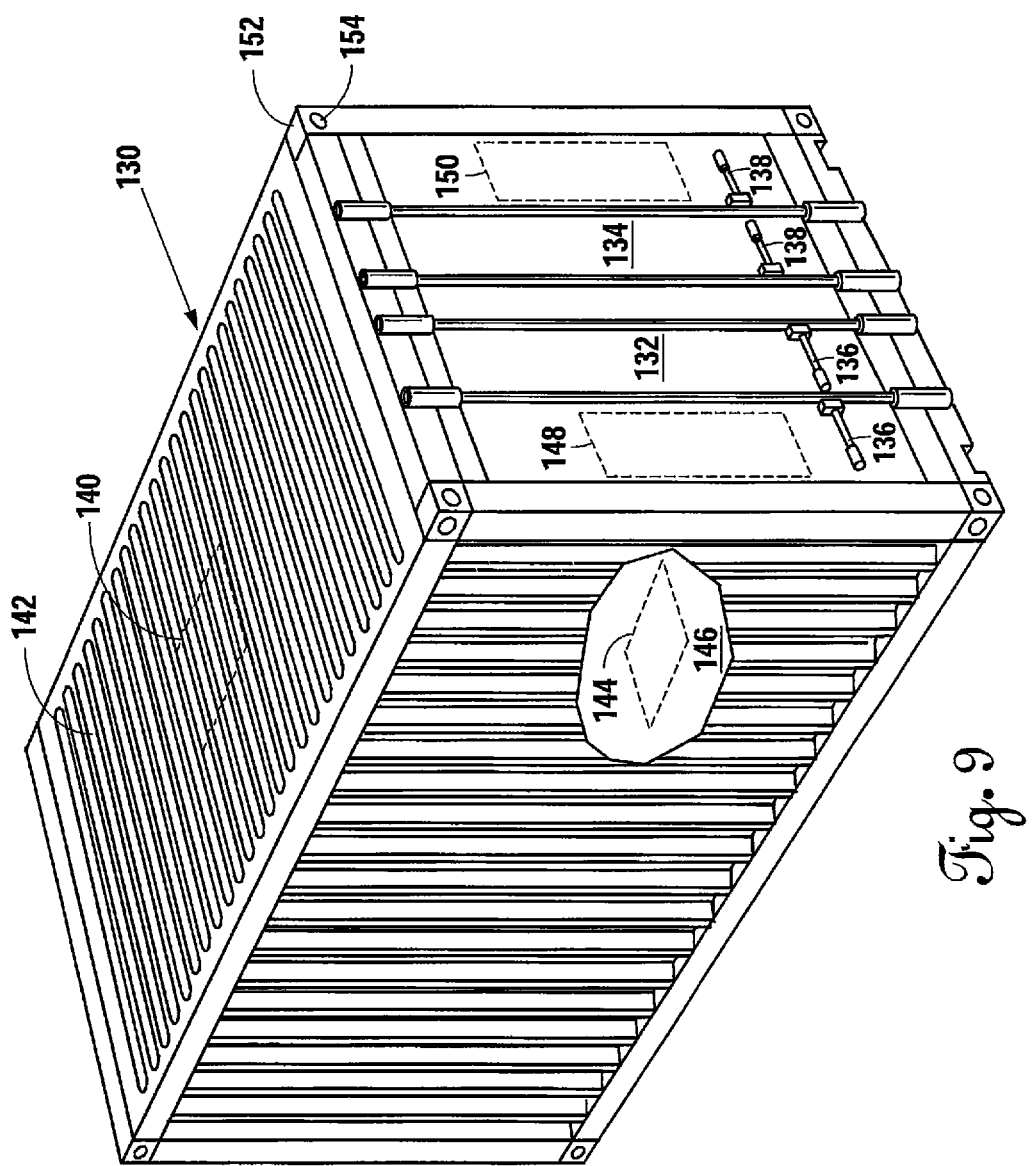
FIG. 9 is a pictorial view of a cargo container illustrating where openings should be cut.

Referring now to FIG. 9, a standard 8 ft.×8-½ ft.×20 ft. cargo container 130 is shown. The cargo container 130 is made out of corrugated metal and has doors 132 and 134, on the one end thereof, which doors 132 and 134 are operable by handles 136 and 138, respectively. Top hole 140 is cut into the top 142 of the cargo container 130. Bottom hole 144 is cut into bottom 146 of the cargo container 130. Control panel openings 148 and 150 are cut in doors 132 and 134, respectively. The cargo container 130 as illustrated in FIG. 9 has eight corner castings 152 with openings 154 for twist-lock fasteners (not shown).

Figure 10:
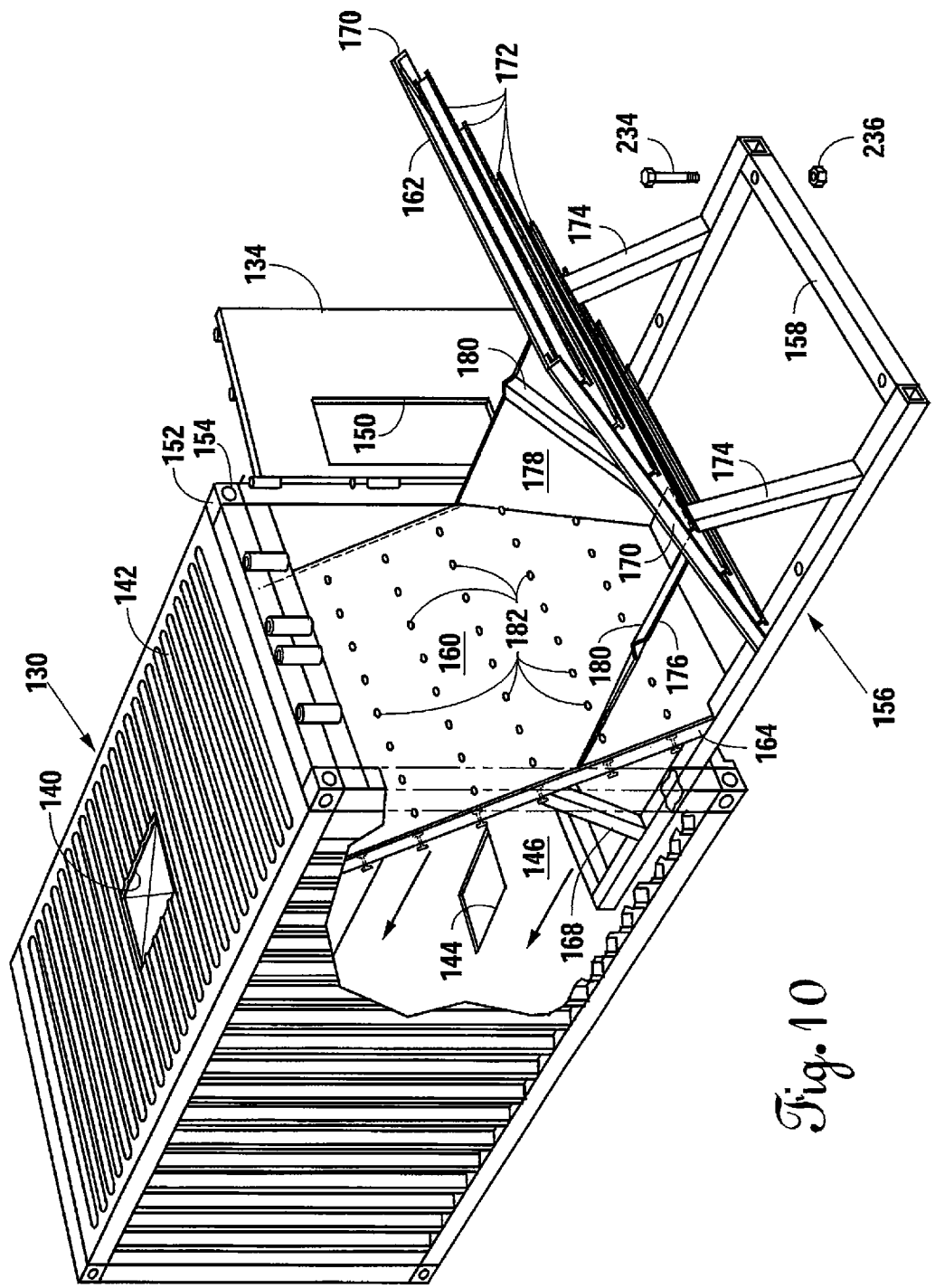
FIG. 10 is the cargo container shown in FIG. 9 with the holes cut and a hopper module being inserted therein.

Referring now to FIG. 10, modification of the cargo container 130 is shown. The top hole 140 and bottom hole 144 have been cut as well as the control panel openings 148 and 150. The control panel opening 150 is illustrated because door 132 has been removed so the hopper module 156 can be seen as it is being inserted inside of cargo container 130. Alternatively, the hopper module 156 may be constructed inside of the cargo container 130.

Figure 12:
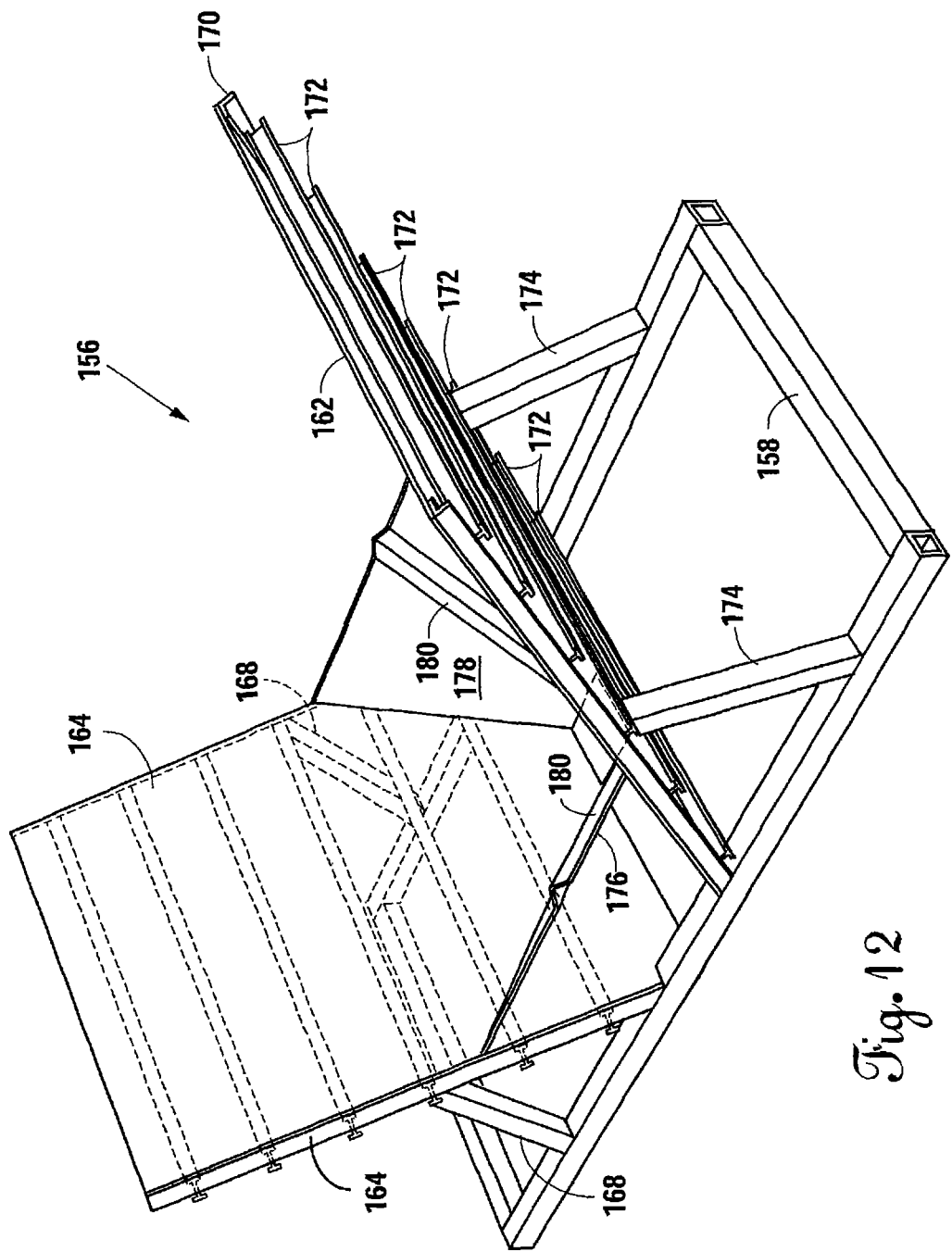
FIG. 12 is a perspective view of the hopper module to be inserted in the cargo container of FIG. 10.

Referring now to FIGS. 10 and 12, the hopper module 156 will be explained in more detail. Hopper module 156 has a width so that it will fit just inside of the fully opened doors 132 and 134. Hopper module 156 has a base 158 made out of tubular steel. Towards the front of the base 158 is front module wall 160 and towards the rear is rear module wall 162. Behind the front module wall 160 are L-beams 164 with I-beams 166 (see FIG. 17) providing cross support there between. To hold the front module wall at or near the angle of repose of sand or similar granular material, front braces 168 are located between the L-beams 164 and the base 158.

Just as the front module wall 160 is supported, rear module wall 162 is also supported by L-beams 170 and I-beams 172. The rear module wall 162 is held at or near the angle of repose by rear braces 174, extending between L-beams 170 and base 158.

On each side of the hopper module 156 is located left side wall 176 and right side wall 178. Both the left side wall 176 and the right side wall 178 have a ridge 180 formed therein to give additional strength to either the left side wall 176 or the right side wall 178.

As can be seen in FIG. 10, the front module wall 160 has numerous weld spots 182 therein, which is where the front module wall 160 is electrically welded to the I-beams 166 located there behind. The weld spots are only illustrated in FIG. 10. The hopper module 156 is wide enough so that it barely fits inside of cargo container 130.

Figure 11:
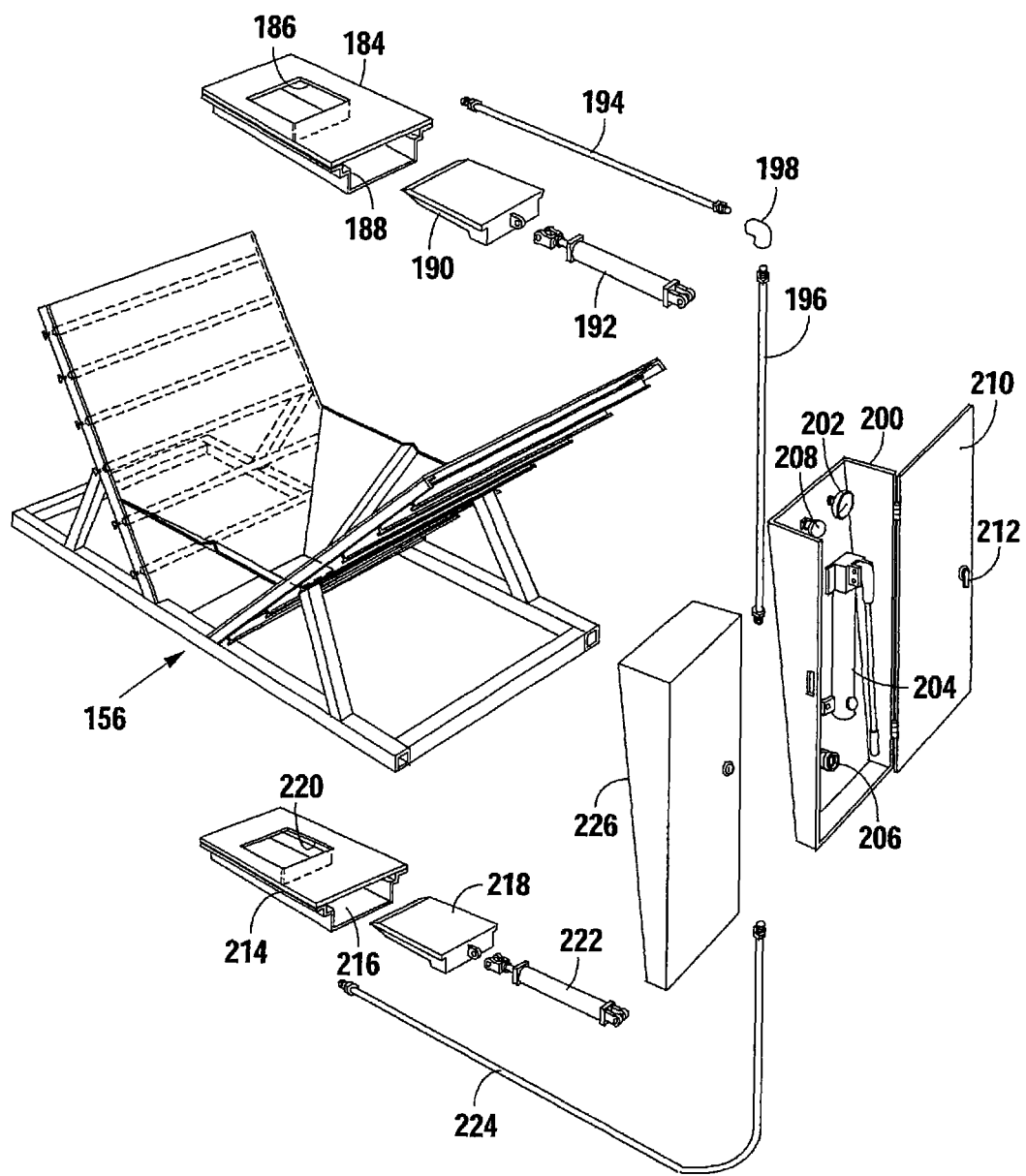
FIG. 11 is an exploded perspective view of the equipment that needs to be added to the cargo container illustrated in FIGS. 9 and 10.

The component parts needed to retrofit the cargo container 130 are illustrated in the exploded perspective view of FIG. 11. The hopper module 156 has already been explained in conjunction with FIGS. 10 and 12. At the top hole 140 (see FIG. 10) is located an upper hatch 184, which upper hatch 184 has an upper opening 186 therein. Upper hatch 184 has a wedge-shaped slot 188 there below with an upper sliding door 190 (as will be explained in more detail subsequently) that slides back and forth into wedge-shaped slot 188 to open and close the upper opening 186 in the upper hatch 184. An upper hydraulic cylinder 192 moves the upper sliding door 190 from the open to closed position and vice versa. Hydraulic lines 194 and 196 connect via elbow 198 to upper hydraulic control panel 200 inside of the upper hydraulic control panel 200. The hydraulic lines connect via pressure gauge 202 to either a hand-operated hydraulic pump 204 or a remote hydraulic connection 206. If hydraulic pressure needs to be relieved from the upper hydraulic cylinder 192, the pressure may be relieved by pressure relief valve 208. The upper hydraulic control panel 200 may be closed and locked by closing the upper hydraulic panel control door 210 and locked by turning the lock 212.

The bottom hole 144 (see FIG. 10) is operated the same way with a lower hatch 214 having a wedge-shaped slot 216 therein in which the lower sliding door 218 opens and closes the lower opening 220, operation of the lower sliding door 218 being controlled by lower hydraulic cylinder 222. The lower hydraulic cylinder 222 is connected by hydraulic line 224 to the lower hydraulic control panel 226. The lower hydraulic control panel 226 works in the same manner as the upper hydraulic control panel 200. Therefore, the internal workings will not be explained again.

Figure 13:
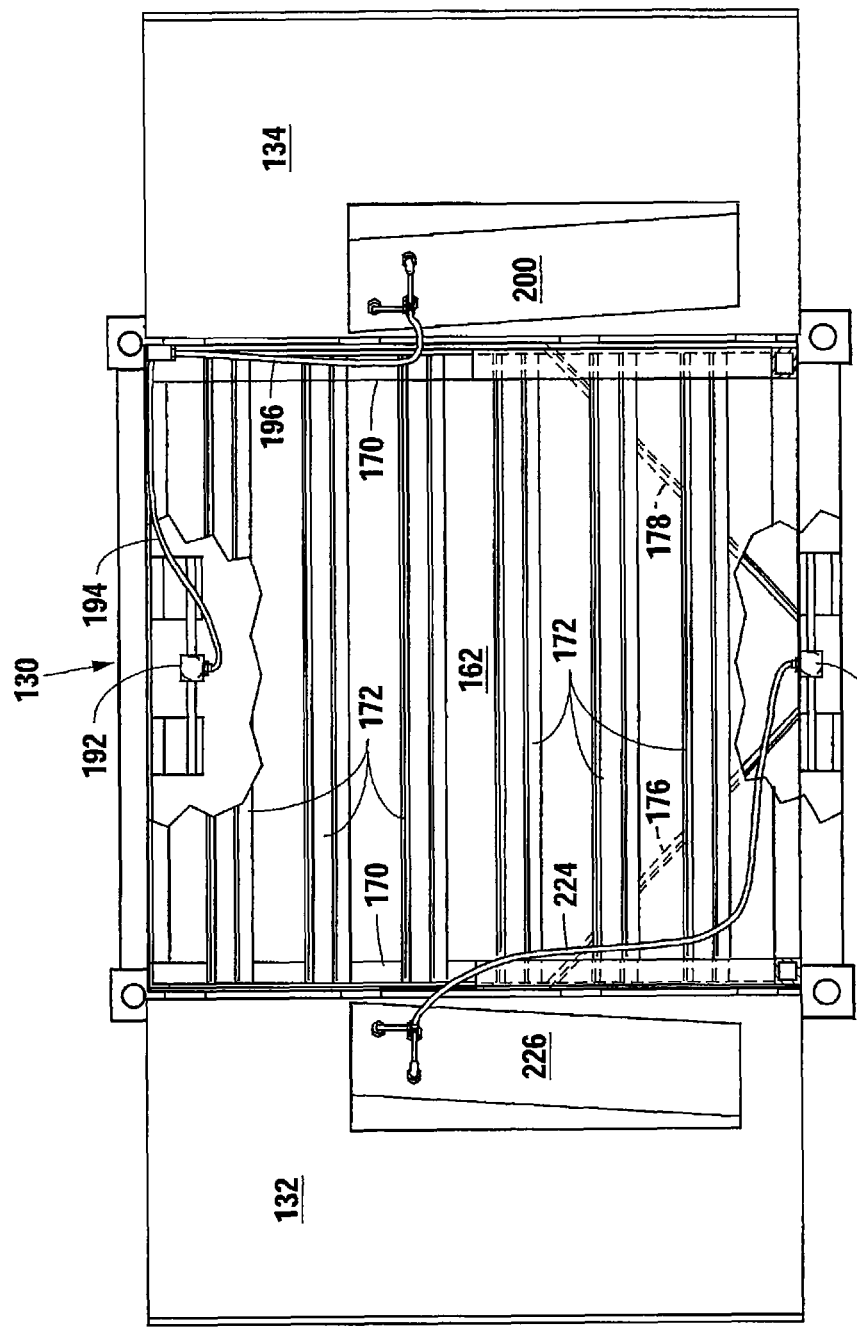
FIG. 13 is an elevated end view of a modified cargo container with the end doors opened.
Figure 14:
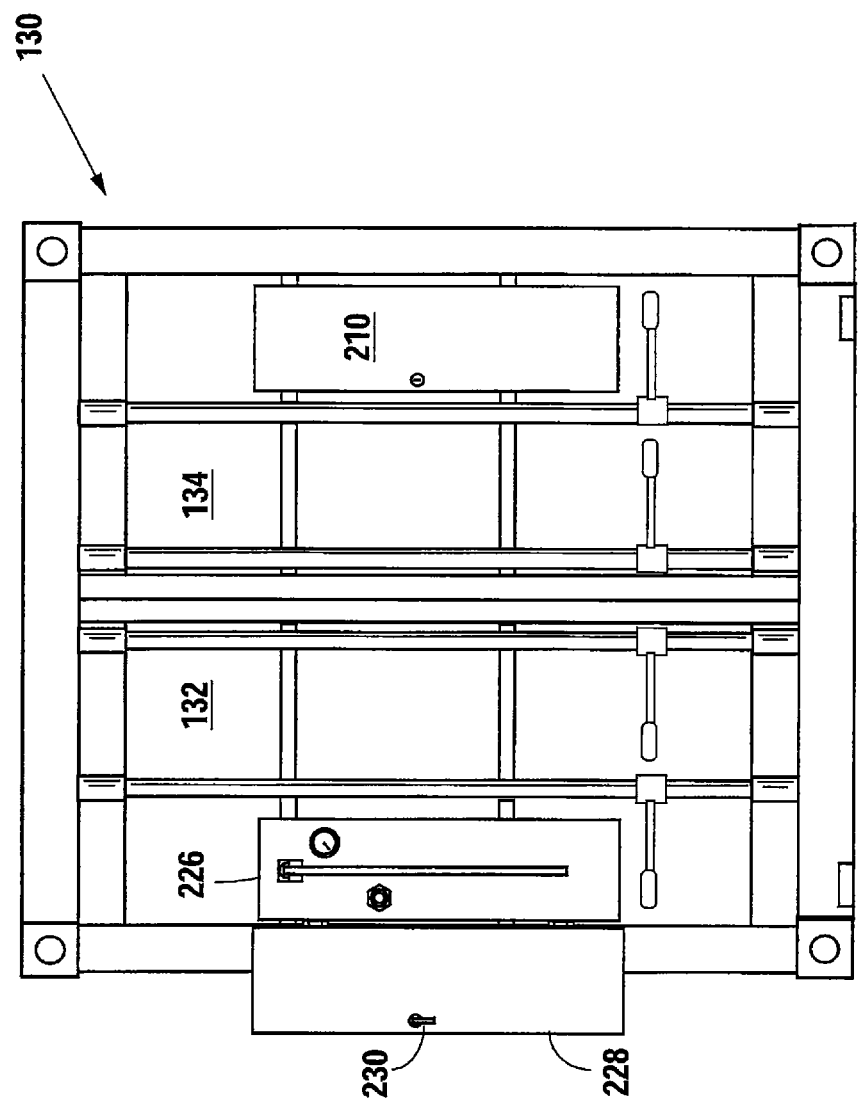
FIG. 14 is an end view of a modified cargo container illustrating the control panels.

Referring to FIGS. 13 and 14 in combination, the elevated end view of a modified cargo container 130 is shown, first with the doors 132 and 134 being opened in FIG. 13, then closed in FIG. 14. Referring first to door 132, lower hydraulic control panel 226 is shown. The hydraulic line 224 connects to the lower hydraulic cylinder 222 to open the lower hatch (not shown in FIG. 13).

On the other door 134 is located upper hydraulic control panel 200 which connects through hydraulic lines 196 and 194 to upper hydraulic cylinder 192 to open the upper hatch (not shown in FIG. 13).

The end of rear module wall 162 can be seen along with the L-beams 170 and the I-beams 172. Likewise, the left and right side walls 176 and 178, respectively, can be seen in broken lines.

Referring to FIG. 14, doors 132 and 134 are closed with the lower hydraulic control panel 226 being opened and the upper hydraulic control panel door 210 being closed. The door 228 of the lower hydraulic control panel 226 can be closed and locked via lock 230.

Figure 15:
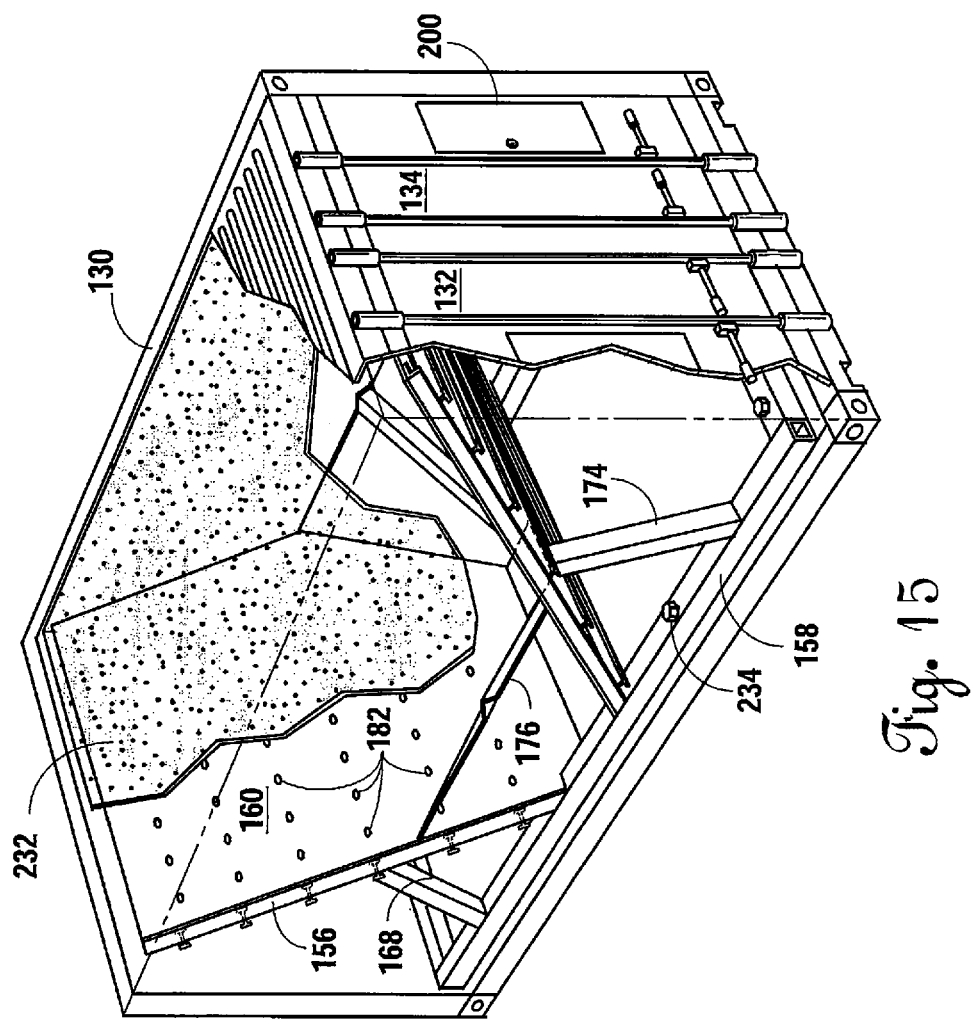
FIG. 15 is a partial sectional view of a modified cargo container.

Referring now to FIG. 15, a partial exploded view of the cargo container 130 having a hopper module 156 therein is shown. The inside of the hopper module 156 is covered with a liner material 232. The types of the liner material 232 may vary, but the type that is found to work well by Applicant is a "Greased Lightning Liner" made by RRR Supply, Inc. The inside of the cargo container 130, and more particularly, the inside of the hopper module 156, are coated with the liner material 232, which liner material 232 is very slick. This greatly reduces the angle of repose (the angle at which the granular material will flow) inside of cargo container 130.

Referring to FIGS. 10 and 15, the hopper module 156 is held into position by bolts 234 connecting through the bottom 146 of the cargo container 130 to nut 236. While only one bolt 234 and nut 236 are illustrated, several would be used.

Figure 16:
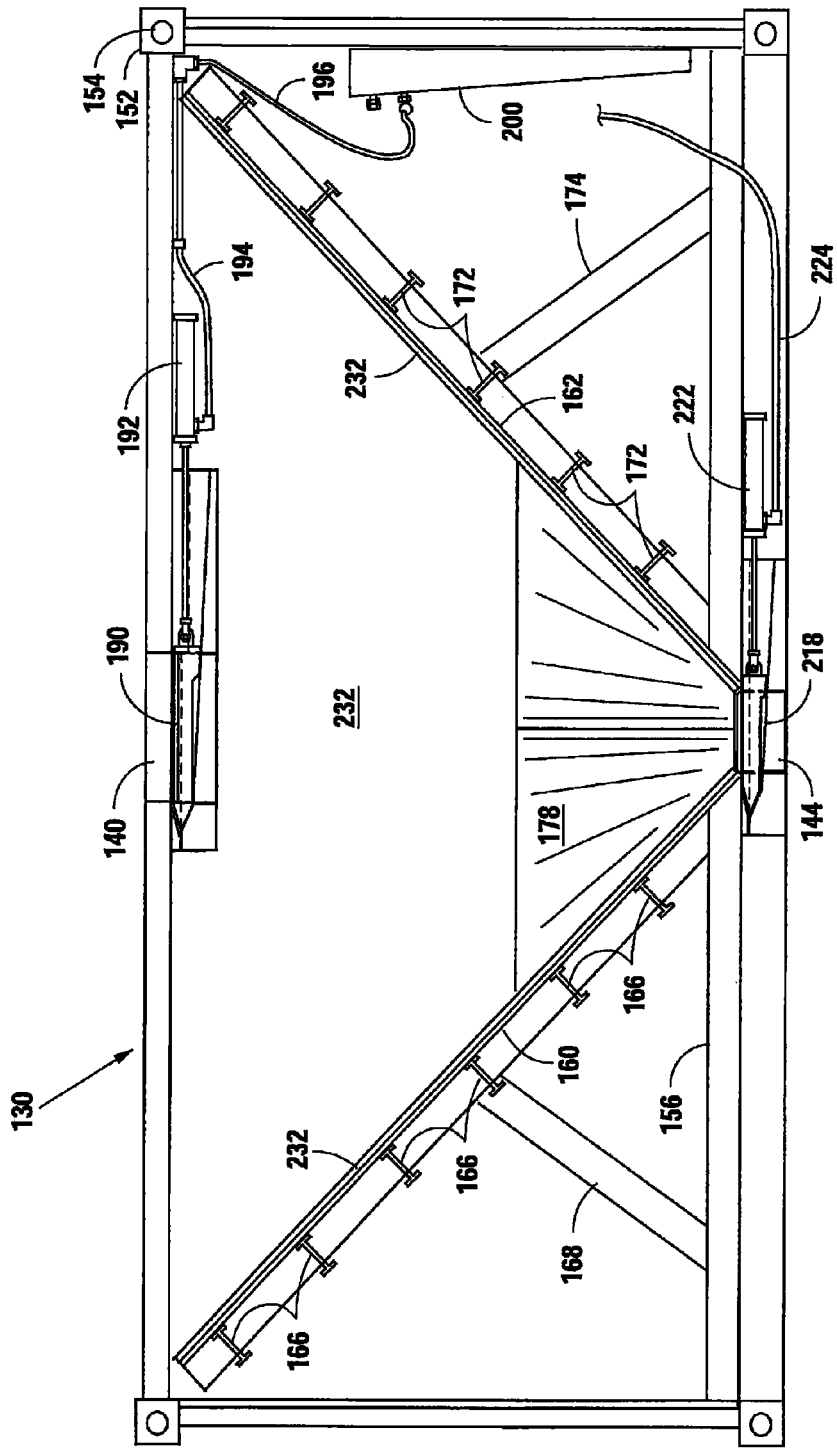
FIG. 16 is an elevated sectional view of one side of the modified cargo container illustrating the upper and lower hatches being closed.
Figure 17:
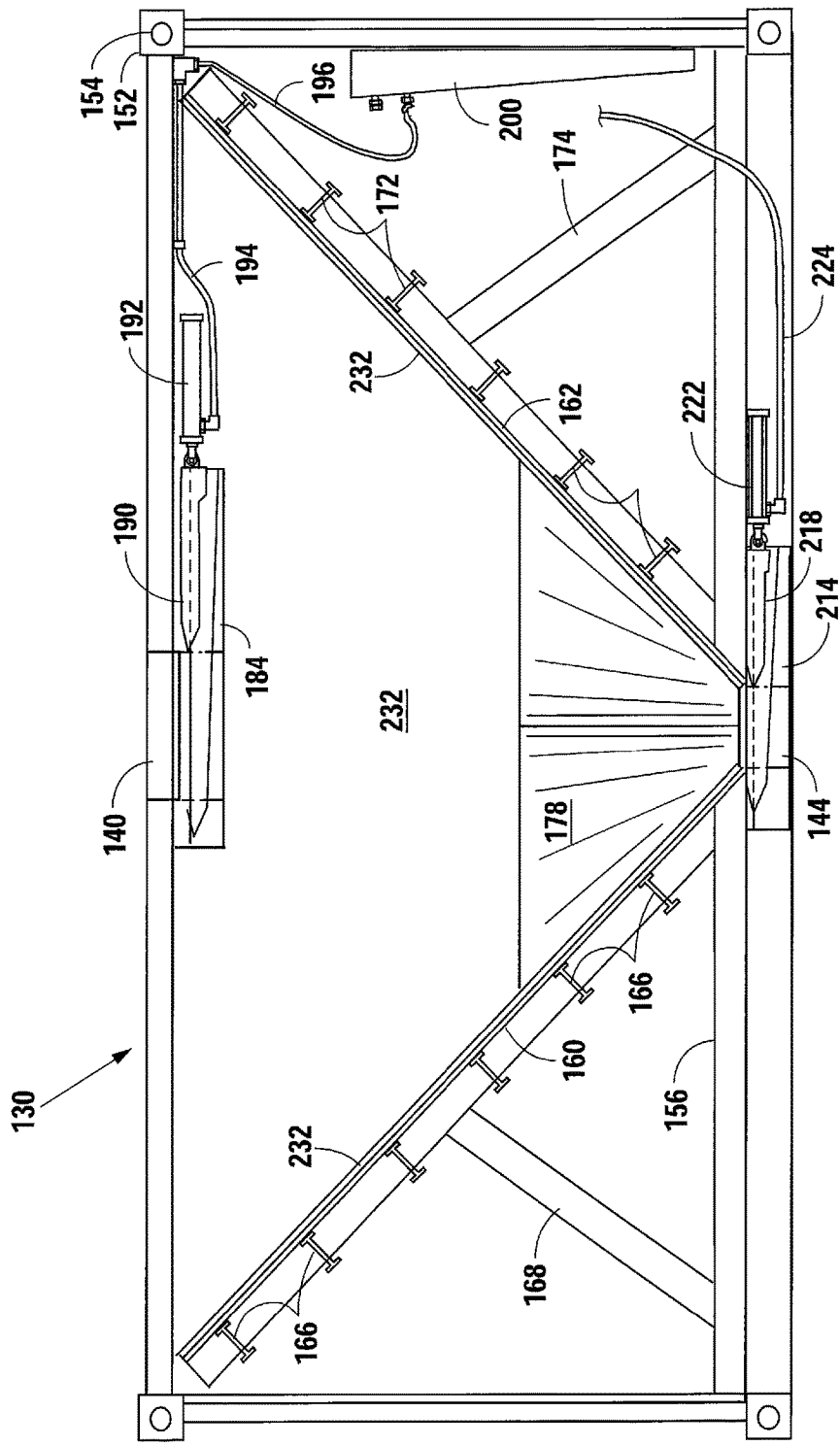
FIG. 17 is an elevated sectional view of one side of the modified cargo container illustrating the hatches being opened.

Referring to FIGS. 16 and 17, the operation of the upper hatch 184 and lower hatch 214 is explained in detail. The top hole 140 and the bottom hole 144 can be seen in both FIGS. 16 and 17. However, in FIG. 17, upper hatch 184 is opened because upper sliding door 190 is retracted by upper hydraulic cylinder 192. Also in FIG. 17, bottom hole 144 is open because lower hatch 214 has lower sliding door 218 retracted by lower hydraulic cylinder 222. The lower hydraulic cylinder 222 connects through hydraulic line 224 to the lower hydraulic control panel 226 (not shown in FIGS. 16 and 17). The upper hydraulic cylinder 192 will connect through hydraulic lines 194 and 196 to upper hydraulic control panel 200.

FIG. 16 is the same as FIG. 17, except the upper sliding door 190 and lower sliding door 218 are both closed. This occurs via upper hydraulic cylinder 192 and lower hydraulic cylinder 222, respectively. Otherwise, everything is the same.

Figure 18:
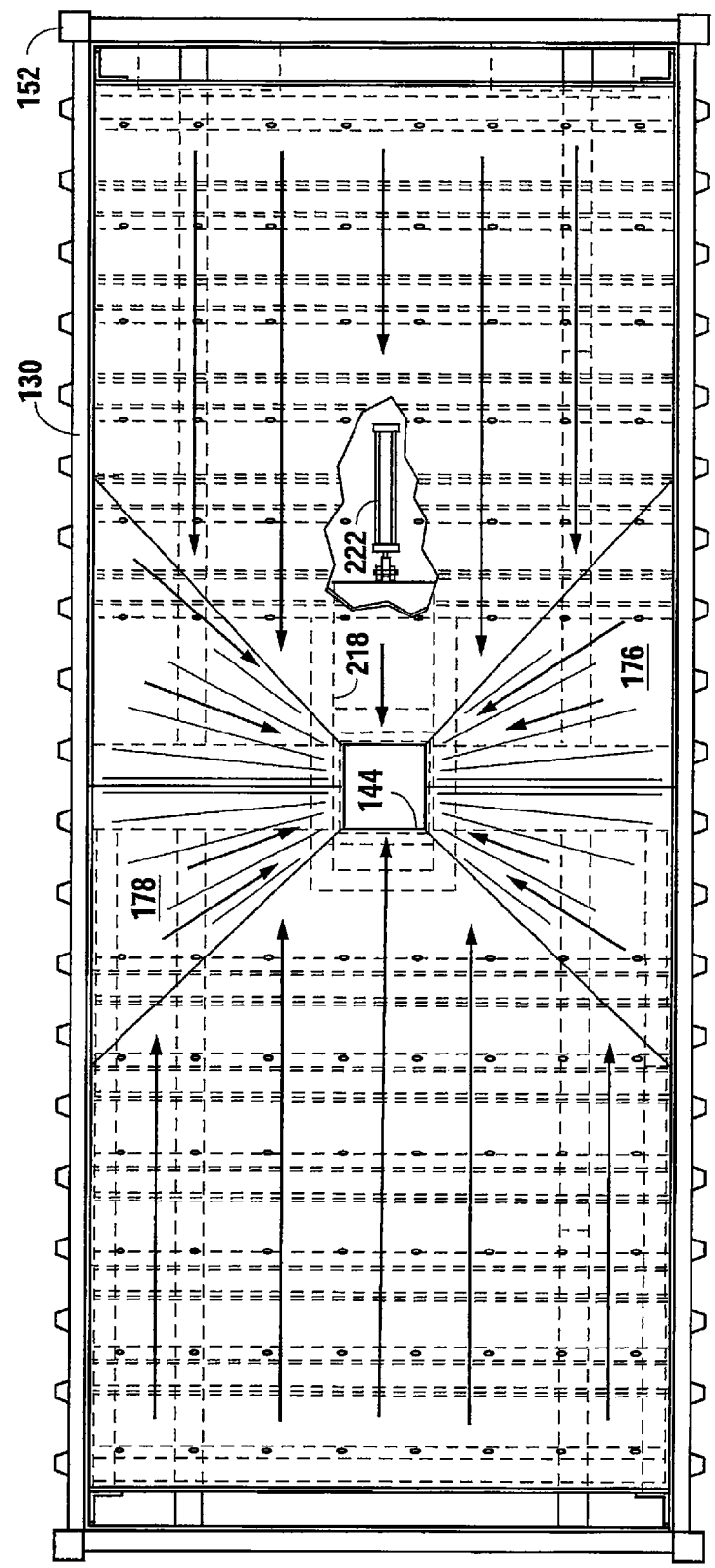
FIG. 18 is a top sectional view of the modified cargo container illustrating flow of the sand therefrom.

Referring now to FIG. 18, a top view of the cargo container 130 as modified is shown, but with the top 142 removed. The lower hydraulic cylinder 222 has moved the lower sliding door 218 so that the bottom hole 144 is now open. Any sand or granular material contained inside of modified cargo container 130 flows down towards the bottom hole 144 in the direction indicated by the arrows.

If there is any space between left side wall 176 and right side wall 178, it is filled in with a spray on material sold under the mark LINE-X. The LINE-X makes sure there is no space between the Greased Lightning sheets of material and the edges. The inside of the modified cargo container 130 will have a slick container hopper area.

Figure 19:
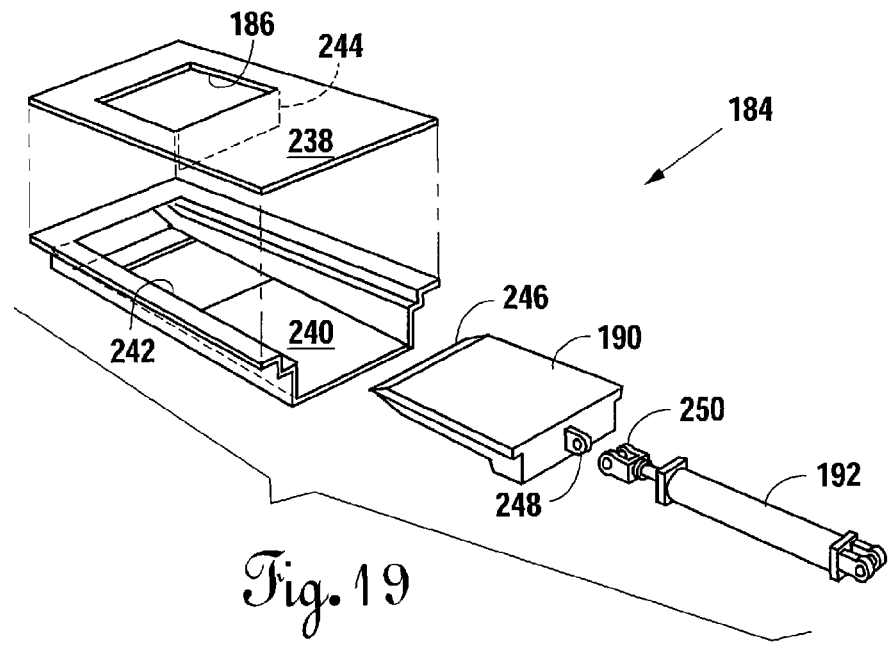
FIG. 19 is an exploded perspective view of a sliding door used at an upper or lower hatch.
Figure 20A:
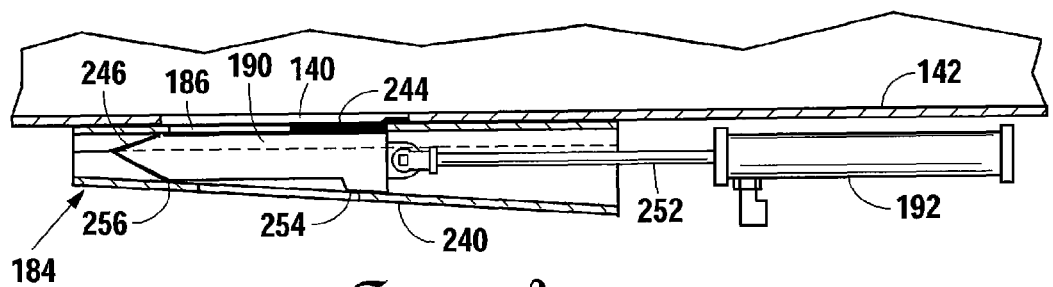
FIG. 20A is a cross-sectional view of a sliding door for a hatch being closed.
Figure 20B:
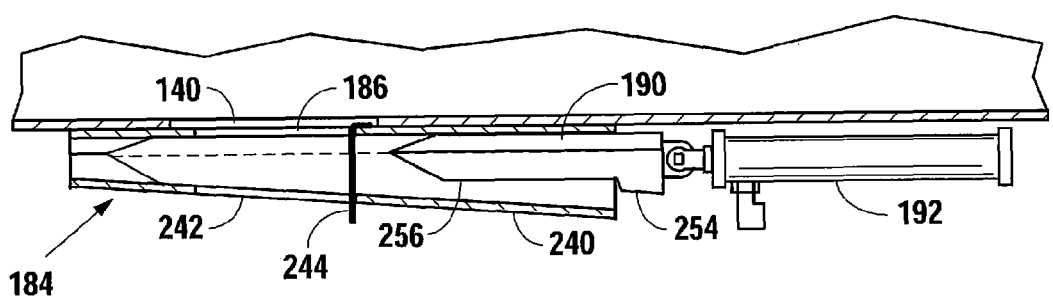
FIG. 20B is a cross-sectional view of a sliding door at a hatch being opened.

Referring now to FIGS. 19, 20A and 20B in combination, the operation of either the upper hatch 184 or lower hatch 214 is illustrated. For the purposes of consistency and numbers, FIGS. 19, 20A and 20B are being explained as operation of the upper hatch 184. The upper hatch 184 has a top plate 238 through which the upper opening 186 is cut. The top plate 238 connects to a wedge-shaped trough 240. The wedge-shaped trough 240, in combination with the top plate 238, makes up the upper hatch 184. The wedge-shaped trough 240 has a lower opening 242 therein. A resilient flap 244 made from a flexible material such as rubber hangs down from top plate 238 as is illustrated in FIG. 19.

The upper sliding door 190 has a wedge-shape front end 246 and a pivot point 248 on the rear thereof for connection to the clevis 250 on the front of the upper hydraulic cylinder 192.

In FIG. 20A, the upper hatch 184 is shown in a closed position. The upper sliding door 190 is moved all the way forward by the piston rod 252 of the upper hydraulic cylinder 192. The wedge shape 246 on the front of the upper sliding door 190 moves the resilient flap 244 upward and out of the way. The wedge-shaped trough 240 presses against the bottom shoulder 254 of the sliding door 190. Likewise, the front part of the wedge-shaped trough 240 presses against the front lower edge 256 of upper sliding door 190. The upward force on the bottom shoulder 254 and the front lower edge 256 by the wedges-shaped trough 240 causes a complete sealing of the top hole 140 and the upper opening 186 in the upper hatch 184.

Referring now to FIG. 20B, the upper sliding door 190 has been retracted by the upper hydraulic cylinder 192 so that now the top hole 140 and the upper opening 186 in hatch 184 are open and in alignment with lower opening 242 so that any sand there above will flow there through. The resilient flap 244 drops down as illustrated in FIG. 20B.

The lower hatch 214 operates in the same manner as the upper hatch 184 as previously described in conjunction with FIGS. 19, 20A and 20B.

Operation of the upper hydraulic cylinder 192 is explained in conjunction with FIGS. 21A and 21B. The upper hydraulic cylinder 192 has a cylinder 258 with a piston 260 located in one end thereof. Typically, pressure is applied to the piston 260 through pressure connection 262. In the unpressurized state, spring 264 forces piston 260 out, which in turn pushes piston rod 252 with the clevis 250 outward, which in turn will close upper sliding door 190 as shown in FIG. 20A. The upper hydraulic cylinder 192 is held in position by pivot connection 266.

Alternatively, hydraulic pressure may be used to extend and retract the upper hydraulic cylinder 192 or lower hydraulic cylinder 222.

When pressure is applied to the upper hydraulic cylinder 192 as previously explained in FIG. 21A, the piston 260 is moved in the opposite direction and the spring 264 compressed. This causes the piston rod 252 to be retracted inside of cylinder 258. As long as pressure is applied through pressure connection 262, spring 264 will remain compressed and the upper sliding door 190 retracted as shown in FIG. 20B.

Figure 22:
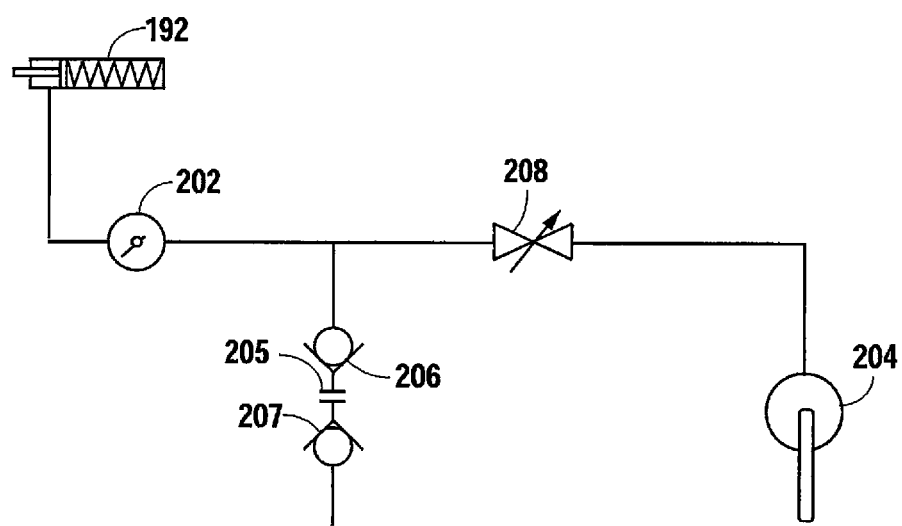
FIG. 22 is a schematic illustration of the opening and closing of hatches for a modified cargo container.

The sequence of operation is explained in the schematic of FIG. 22, which is for opening the upper hatch 184, but can equally apply to lower hatch 214. Upper hydraulic cylinder 192 can receive pressurized hydraulic fluid from either hand-operated hydraulic pump 204 or remote hydraulic connection 206. Remote hydraulic connection 206 may connect through hydraulic plug 205 to a remote hydraulic fluid source 207. Pressure gauge 202 monitors pressure being delivered to upper hydraulic cylinder 192. Pressure relief valve 208 may relieve the pressure if excessive, or to return upper hydraulic cylinder 192 to its normally extended position, i.e., hatch 184 closed.

The various supply chains and the numerous handling of sand was explained in conjunction with FIG. 1. The supply chain can be greatly reduced by use of a modified cargo container 130 as previously described in conjunction with FIGS. 9 through 22.

Figure 2:
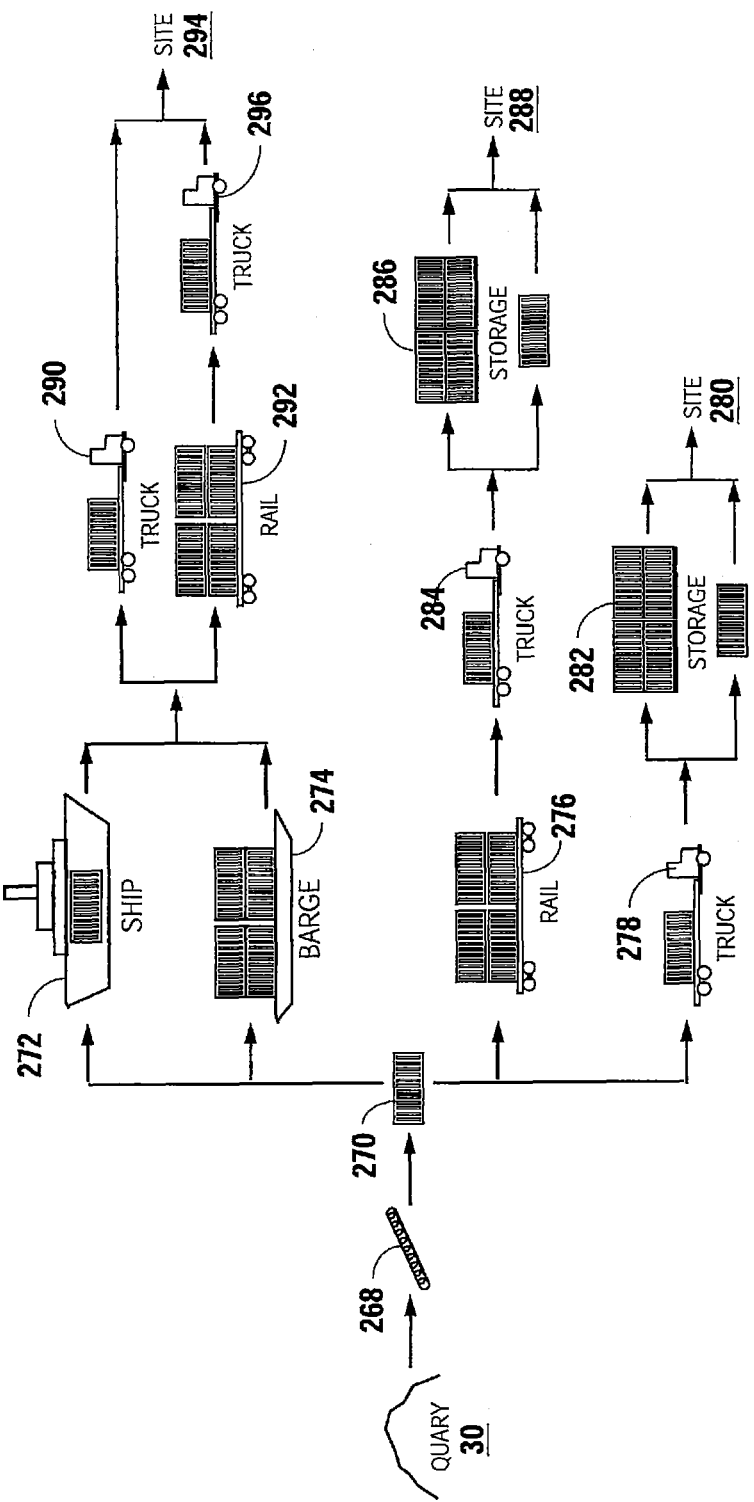
FIG. 2 illustrates the present invention being used to deliver sand from the quarry or source to the frac site.

Turning to FIG. 2, sand from the sand quarry 30 or source can now be loaded by a conveyer 268 to a modified cargo container which hereinafter will be referred to by reference numeral 270. Modified cargo containers 270 can be loaded on a ship 272, barge 274, rail 276 or a flatbed truck trailer 278. Obviously, multiple modified cargo containers 270 may be loaded on each of these alternative modes of transportation.

If the modified cargo containers 270 are loaded on flatbed truck trailer 278 or container chassis, the modified cargo containers 270 can be taken directly to the fracing site 280 or placed in storage 282 at the fracing site 280.

Concerning sand being hauled by rail 276, the modified cargo containers 270 will have to be off-loaded onto flatbed truck trailer 284, which flatbed truck trailer 284 can then take the modified cargo containers 270 filled with fracing sand either to storage 286 or to the fracing site 288.

Concerning the modified cargo containers 270 being hauled by ship 272 or barge 274, the modified cargo containers 270 will have to be off-loaded onto either a flatbed truck trailer 290 or a rail car 292. If being hauled by the flatbed truck trailer 290, the modified cargo container 270 can be taken directly to the fracing site 294. However, if modified cargo containers 270 are being transported by rail car 292, they must be off-loaded onto flatbed truck trailer 296 prior to be taken to the fracing site 294.

By just comparing FIGS. 1 and 2, it can be easily seen that the sand is being handled fewer times by the use of the modified cargo container 270. This results in considerably less expense, which reduces the price of fracing sand or other proppants to the well operator. The reduction in price can be in the millions of dollars per well.

Figure 3:
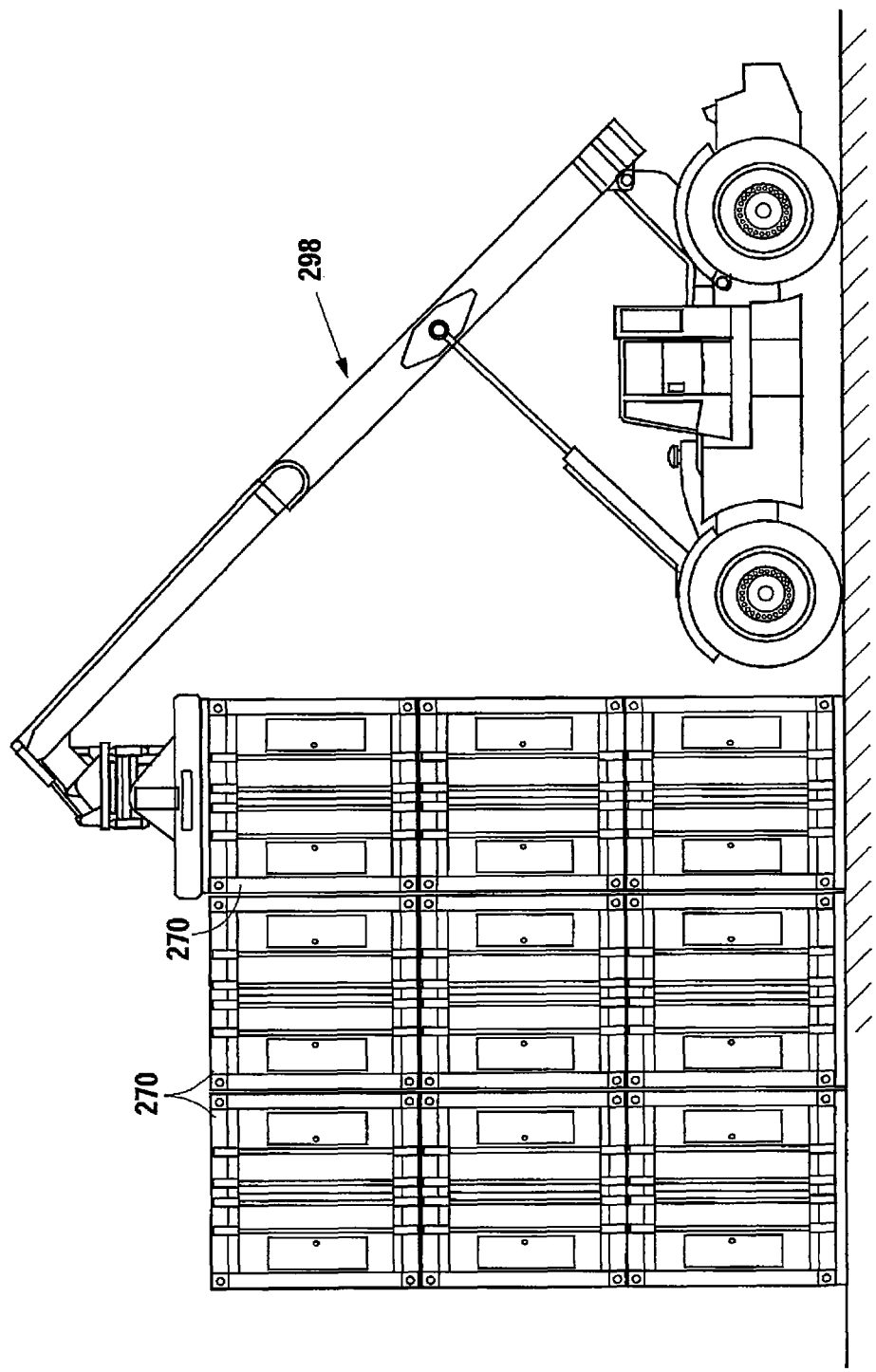
FIG. 3 is a pictorial illustration of the stackability of modified cargo containers, with or without sand therein.
Figure 4:
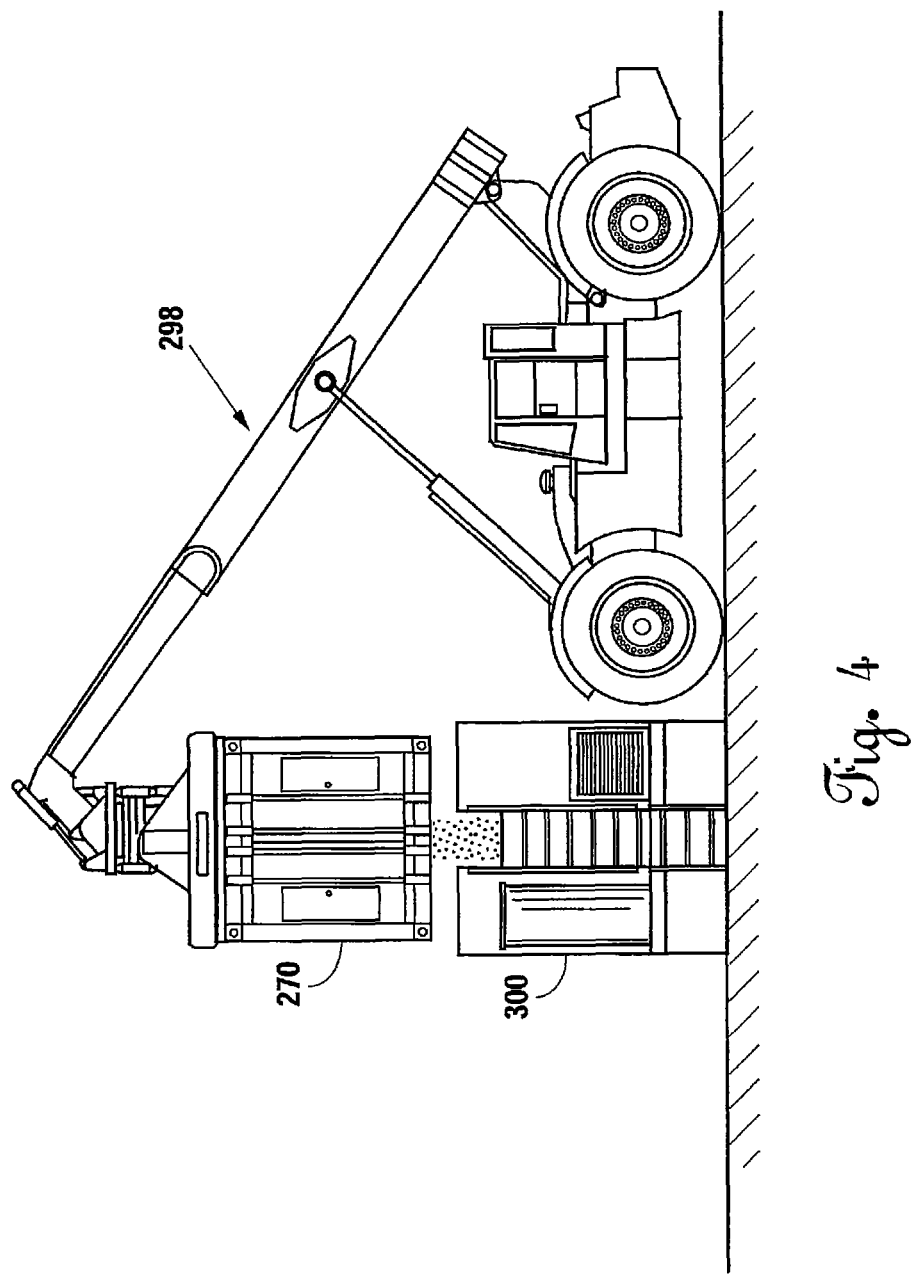
FIG. 4 is an illustration showing sand being unloaded from a modified cargo container at the frac site into a bulk sand container.

At the well site to be fraced, modified cargo containers 270 can be stacked as shown in FIG. 3. Since well sites have a tendency to be rough, the Rough Terrain Container Handler (RTCH) as made by Kalmar from Cibolo, Tex. may be used to pick up and stack the modified cargo containers 270 as illustrated in FIG. 3. The Rough Terrain Cargo Handler 298 can pick up one of the modified cargo containers 270 full of sand and unload the modified cargo container 270 to a bulk sand container 300 at the frac site (see FIG. 4). The bulk sand container 300 may be the Frac Sander as is made by NOV-HPCO, located at 492 N. W.W. White Road, San Antonio, Tex. 78219. From the bulk sand container 300, sand travels on a conveyer in the bottom thereof to the blender (not shown) at the frac site.

Also, one modified cargo container, while stacked, can feed directly into another modified cargo container located there below. For example, in FIG. 5, modified cargo container 302 receives sand 306 from auger 303 through upper hatch 305. Modified cargo containers 302 may feed sand 306 or any other granular proppant therein through lower hatch 308 in modified cargo container 302 and upper hatch 310 into modified cargo container 304 located immediately there below. This was accomplished by opening the lower sliding door 312 in modified cargo container 302 and the upper sliding door 314 in modified cargo container 304. The sand 306 may either be transferred from the modified cargo container 302 into the modified cargo container 304 located immediately there below or delivered to a conveyer (not shown) located below the lower modified cargo container 304 by opening the lower sliding door 316 in the modified cargo container 304 to open lower hatch 318. The sand flowing from the lower hatch 318 may be dumped on a belt (not shown), which will feed the sand to the blenders (not shown). In the blenders, the sand is mixed with the fracing fluid that will contain other chemicals therein prior to injection under pressure into the well being fraced at the frac site.

Figure 5:
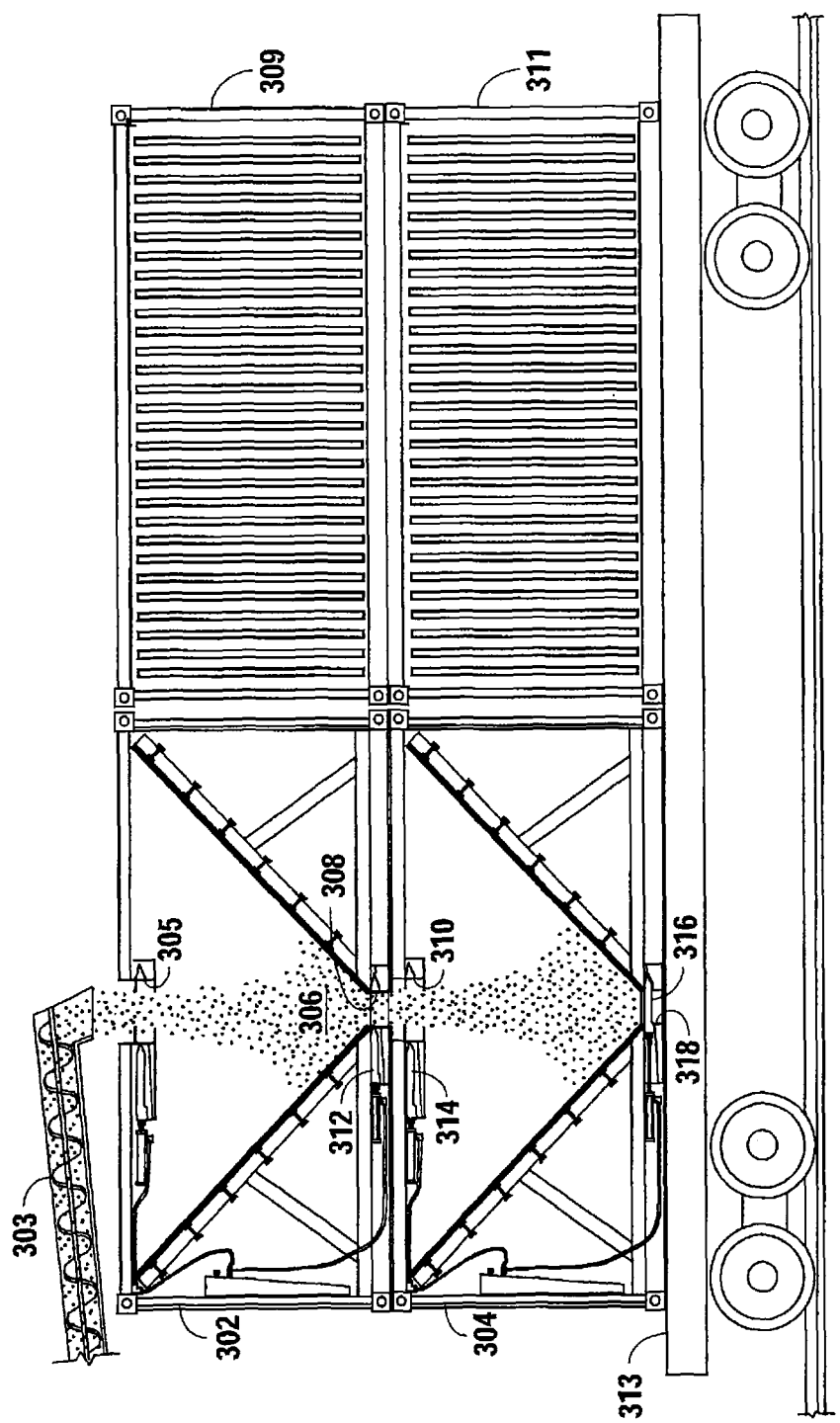
FIG. 5 is an elevated sectional side view showing sand flowing through stacked modified cargo containers.

However, rather than being located over a belt, FIG. 5 illustrates the loading of multiple modified cargo containers 302, 304, 309 and 311 while sitting on rail car 313.

Figure 6:
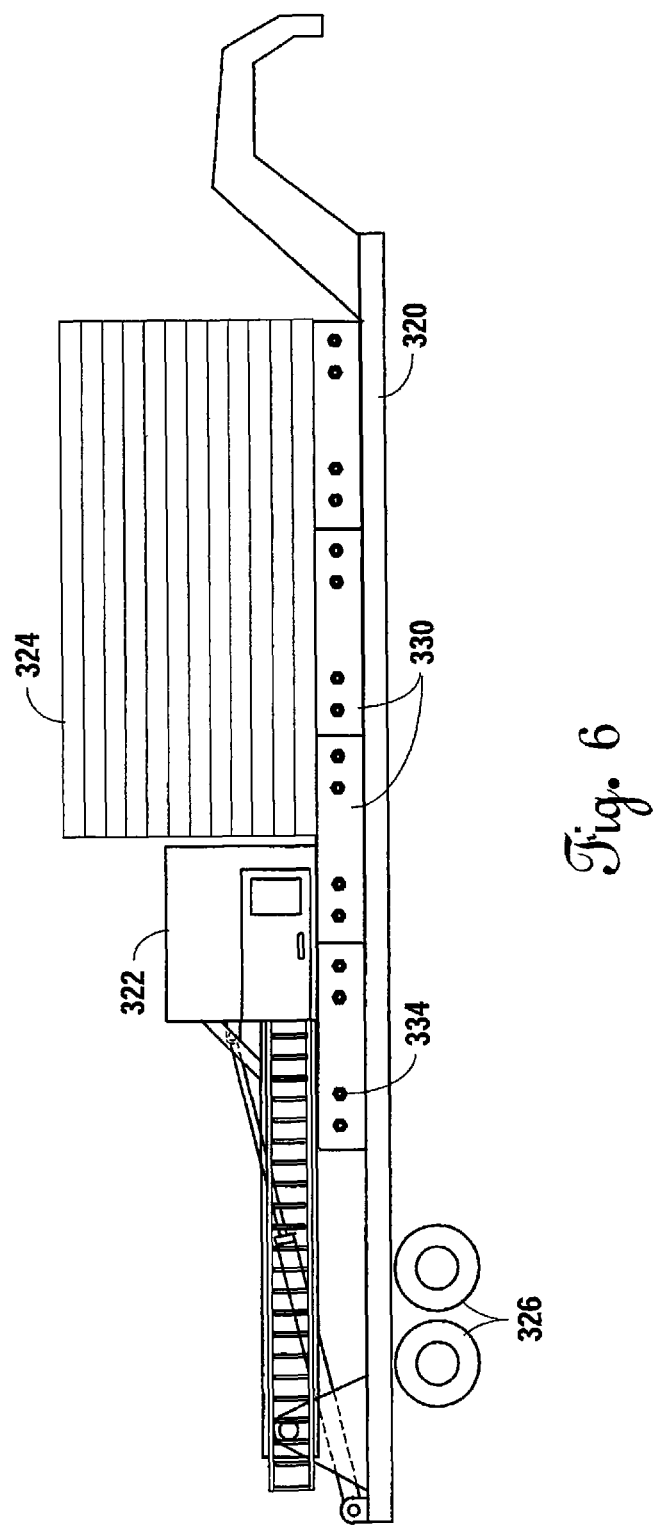
FIG. 6 is an elevated side view of a trailer that can be used with modified cargo containers filled with frac sand.
Figure 7:
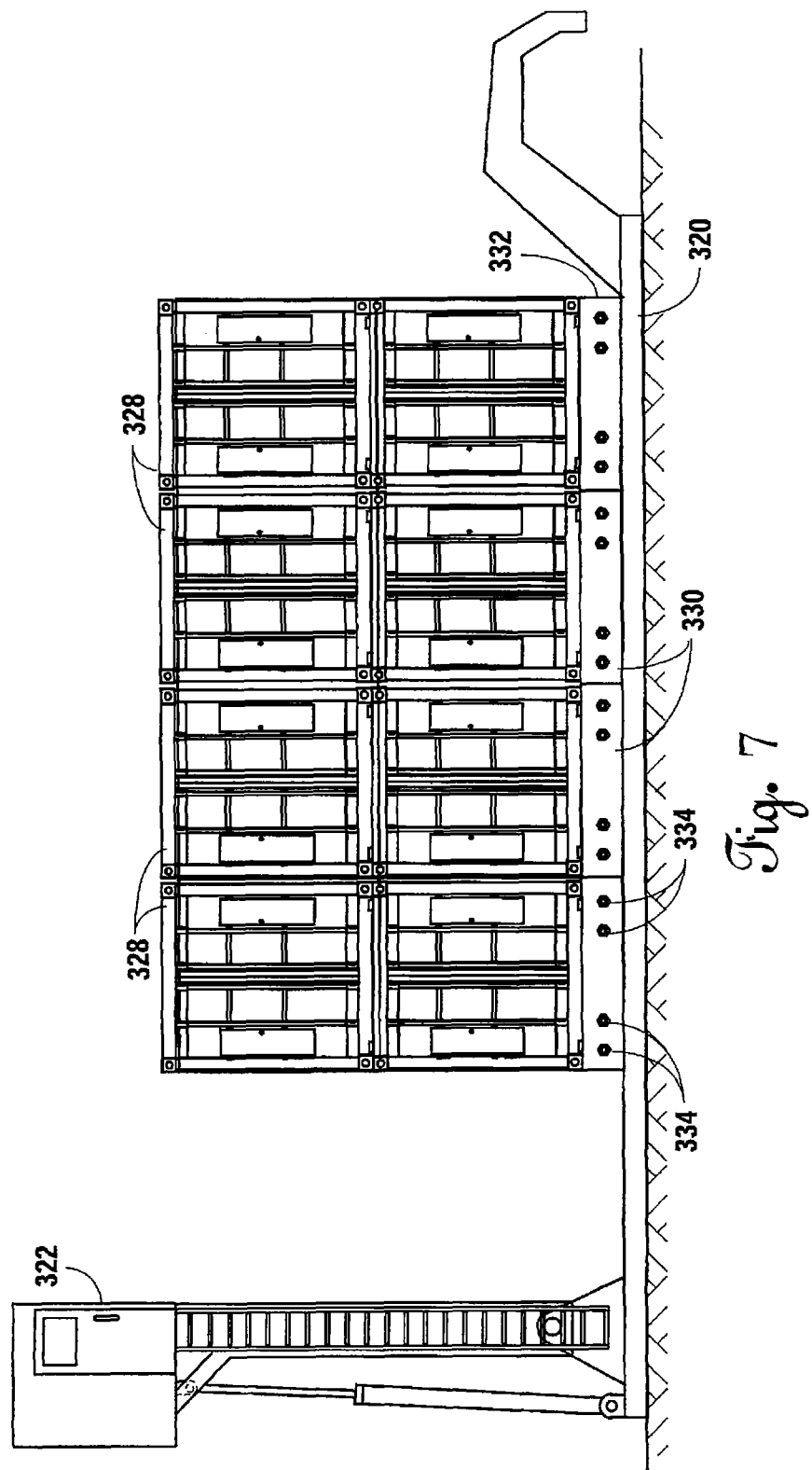
FIG. 7 is an elevated side view of the trailer being used with modified cargo containers thereon which can be filled with frac sand.
Figure 8:
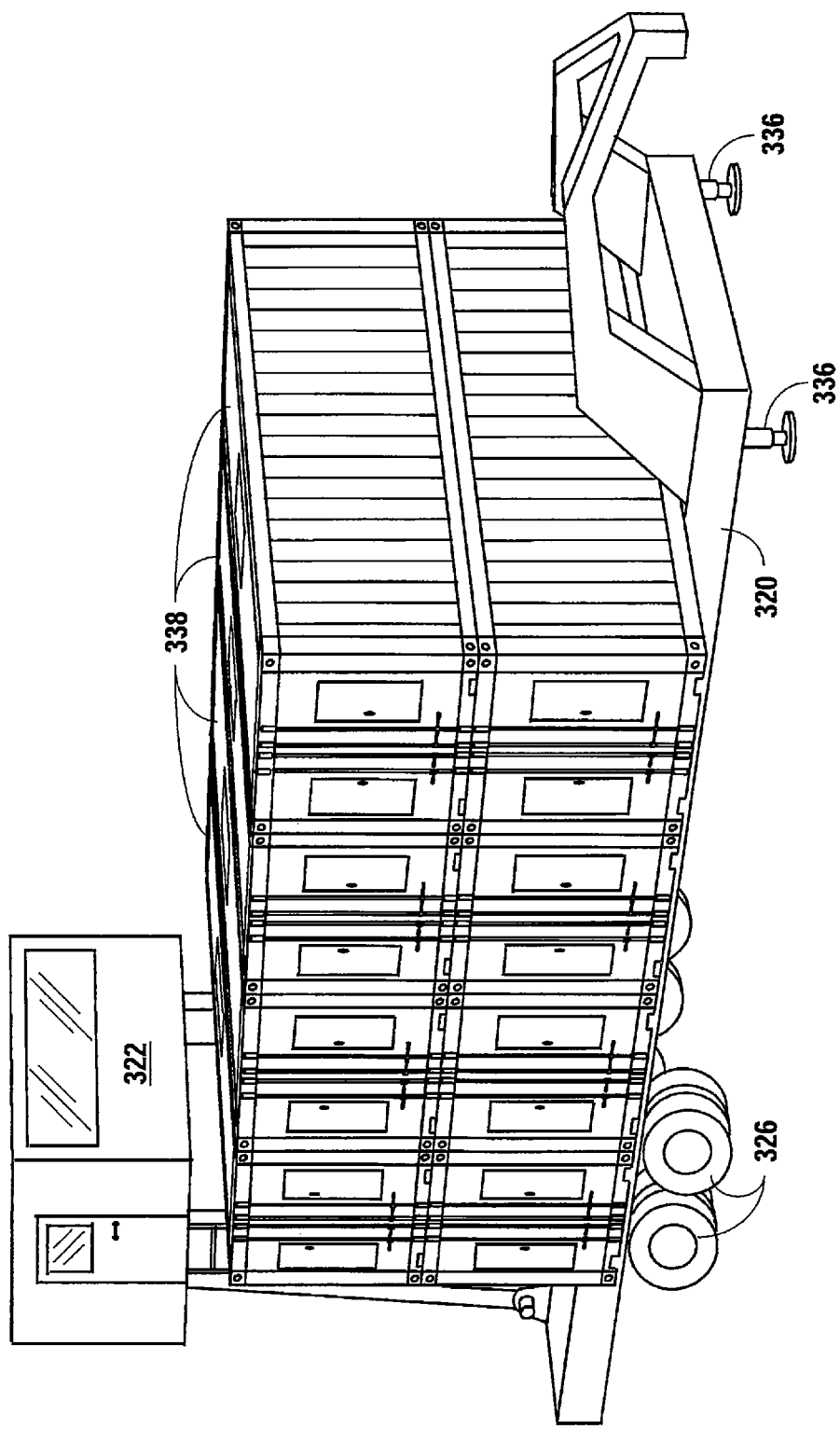
FIG. 8 is a perspective of the trailer shown in FIG. 7.

Referring to FIGS. 6, 7 and 8 in combination, a flatbed trailer 320 is used to create a super T-belt design. A control tower 322 is located on the back end of the flatbed trailer 320. In FIG. 6, the control tower 322 is laying down on the flatbed trailer 320 for movement to the frac site. Also, in FIG. 6, flat racks 324 are being transported to the frac site. Flat racks 324 may be used to the set the modified cargo containers thereon rather than setting them directly on the ground.

Upon arriving at the frac site with the flatbed trailer 320 as shown in FIG. 6, the control tower 322 is deployed as shown in FIG. 7 and the flat racks 324 removed. Also, the wheels 326 and axels (not shown) can be removed so that the flatbed trailer 320 sets directly on the ground as is illustrated in FIG. 7.

Also as illustrated in FIG. 7, modified cargo containers 328 are stacked one on top of the other with the lowermost modified cargo containers fitting directly on a belt system 330 located there below.

In FIG. 7, only the outside view of the belt system 330 is shown. However, fracing sand will be delivered through the dispensing end 332 of the belt system 330 to deliver the fracing sand to the blender. Hydraulic connections 334 may be used to control the operation of any of the sliding doors as previously described herein above. The hydraulic connections 334 may be controlled locally or remotely.

In the alternative, the above trailer 320 can be disconnected with front legs 336 being deployed. Thereafter, the modified cargo containers 338 may be simply stored on the flatbed trailer 320.

By use of the modified cargo containers as described herein above, the number of times the fracing proppant, such as sand, is handled is greatly reduced. The reduction in the number of times the fracing proppant is handled greatly reduces the cost of completion of a single hydrocarbon well.

What I claim is:

1. A modified cargo container for carrying a fracing proppant comprising:
    a cargo container having a plurality of doors at one end thereof;
    a top opening on said cargo container;
    a bottom opening on said cargo container;
    a hopper module mounted within said cargo container, said hopper module comprising:
        a front wall and a back wall, said front wall and said back wall extending from the top of said cargo container to the bottom center of said cargo container;
        side walls connected to said front wall and said back wall, said side walls extending from the sides of said cargo container to the bottom center of said cargo container;
        a base having a quadrilateral configuration; and
        a plurality of braces connecting said front wall and said back wall to said base wherein each of said front, back and side walls is at an angle configured to allow said proppant to flow towards said bottom center of said cargo container;
    a plurality of hatch assemblies located within said cargo container, each of said plurality of hatch assemblies comprising:
        a top plate having an opening therein;
        a flap attached at one end to said opening of said top plate and having the other end of said flap hanging in a vertical configuration relative to said top plate;
        a trough having a wedge-shaped configuration with grooves and an opening therein, said trough connected to said top plate defining a volume therebetween and wherein said trough angles away from said top plate;
        a sliding door having a wedge-shaped end and a shouldered end, said sliding door slidable along said grooves of said trough, said volume adapted to receive said sliding door; and
        a cylinder connected to said sliding door at one end for extending and retracting said sliding door and connected to a hydraulic fluid source at the opposite end; and
    at least one control panel in fluid communication with said plurality of hatch assemblies for actuating said sliding door of said plurality of hatch assemblies from an opened position to a closed position or from said closed position to said opened position.

2. The modified cargo container as recited in claim 1 wherein said opening of said top plate is vertically aligned with said opening of said trough when said sliding door is in said opened position.

3. The modified cargo container as recited in claim 2 wherein one of said plurality of hatch assemblies is in communication with said top opening of said cargo container.

4. The modified cargo container as recited in claim 3 wherein one of said plurality of hatch assemblies is in communication with said bottom opening of said cargo container.

5. The modified cargo container as recited in claim 4 wherein said top opening of said cargo container is in vertical alignment with said bottom opening of said cargo container.

6. The modified cargo container as recited in claim 5 wherein when in said closed position, said wedge-shaped end of said sliding door is received by a corresponding wedge-shaped slot within said trough when said wedge-shaped end of said sliding door is inserted within said volume.

7. The modified cargo container as recited in claim 6 wherein said flap is in a horizontal configuration when said sliding door is in a closed position.

8. The modified cargo container as recited in claim 7 further comprising a liner coated on the inside surfaces of said front, back and side walls of said hopper module.

9. The modified cargo container as recited in claim 8 wherein said inside surfaces of said front, back and side walls of said hopper module promote the flow of granular material in a downward direction.

10. The modified cargo container as recited in claim 9 wherein each of said plurality of hatch assemblies are controlled independently.

11. The modified cargo container as recited in claim 10 wherein said sliding door of each of said plurality of hatch assemblies are actuated remotely.

12. The modified cargo container as recited in claim 11 wherein said modified cargo container is stackable.

\* \* \* \* \*